(12) United States Patent
Jinnai et al.

(10) Patent No.: US 11,370,383 B2
(45) Date of Patent: Jun. 28, 2022

(54) VEHICLE CURTAIN AIRBAG APPARATUS

(71) Applicant: TOYODA GOSEI CO., LTD., Kiyosu (JP)

(72) Inventors: Ryosuke Jinnai, Troy, MI (US); Eric Bush, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 128 days.

(21) Appl. No.: 17/011,067

(22) Filed: Sep. 3, 2020

(65) Prior Publication Data
US 2022/0063545 A1  Mar. 3, 2022

(51) Int. Cl.
| | | |
|---|---|---|
| *B60R 21/232* | (2011.01) | |
| *B60R 21/262* | (2011.01) | |
| *B60R 21/231* | (2011.01) | |
| *B60R 21/213* | (2011.01) | |
| B60R 21/235 | (2006.01) | |
| B60R 21/233 | (2006.01) | |

(52) U.S. Cl.
CPC .......... *B60R 21/232* (2013.01); *B60R 21/213* (2013.01); *B60R 21/23138* (2013.01); *B60R 21/262* (2013.01); *B60R 2021/23308* (2013.01); *B60R 2021/23538* (2013.01)

(58) Field of Classification Search
CPC ... B60R 21/232; B60R 21/213; B60R 21/262; B60R 21/23138; B60R 2021/23538
See application file for complete search history.

(56) References Cited

U.S. PATENT DOCUMENTS

| | | | | |
|---|---|---|---|---|
| 6,106,000 A | * | 8/2000 | Stewart | ................. B60R 21/213 280/740 |
| 2010/0253055 A1 | * | 10/2010 | Schneider | ........... B60R 21/2346 29/428 |
| 2014/0265266 A1 | | 9/2014 | Kemp et al. | |

FOREIGN PATENT DOCUMENTS

| | | | | |
|---|---|---|---|---|
| JP | 2007314077 A | * | 12/2007 | ............. B60R 21/26 |
| JP | 2008-279932 A | | 11/2008 | |
| JP | 2013-133048 A | | 7/2013 | |
| JP | 2013133048 A | * | 7/2013 | |

* cited by examiner

*Primary Examiner* — Karen Beck
(74) *Attorney, Agent, or Firm* — Posz Law Group, PLC

(57) ABSTRACT

A vehicle curtain airbag apparatus includes an inflator and an airbag. The airbag includes an airbag body, an inner tube, and a pocket portion. The inner tube includes a tube body and an insertion portion. The pocket portion is provided in a front end portion of the tube body in an insertion direction of the inner tube. A front end portion of the pocket portion in the insertion direction is joined to the tube body at a first joint portion, which extends in an intersecting direction. The intersecting direction intersects the insertion direction. At least one of the opposite end portions of the pocket portion in the intersecting direction is joined to the tube body at a second joint portion that extends in the insertion direction.

7 Claims, 12 Drawing Sheets

VEHICLE CURTAIN AIRBAG APPARATUS

BACKGROUND

1. Field

The present disclosure relates to a vehicle curtain airbag apparatus that is configured to protect an occupant from an impact by deploying and inflating an airbag accommodated in a section above a side wall of a vehicle toward a space between the occupant and the side wall.

2. Description of Related Art

A vehicle curtain airbag apparatus is known as an apparatus that protects an occupant from an impact from the outside of a vehicle when the impact is applied to or predicted to be applied to the side wall of the vehicle. A vehicle curtain airbag apparatus typically includes an inflator and an airbag. From a section above the side wall, the airbag is deployed and inflated by inflation gas supplied from the inflator toward a space between an occupant and the side wall of a vehicle.

US Patent Application Publication No. 2014/0265266A1 discloses a vehicle curtain airbag apparatus that includes an airbag having an airbag body and an inner tube. The airbag body includes a gas passage portion extending in the front-rear direction of the vehicle. Also, the airbag body includes an inflation portion of which the internal space is continuous with that of the gas passage portion. Further, the airbag body includes a connection portion of which the internal space is continuous with that of the gas passage portion. An inflator is connected to the connection portion.

The inner tube includes a tube body and an insertion portion. The tube body includes a gas outflow port and is arranged in the gas passage portion. The insertion portion is connected to the tube body with the internal spaces being continuous with each other, and is arranged in the connection portion. At least the gas outlet portion of the inflator is inserted into the insertion portion. The gas outflow port allows inflation gas supplied to the tube body to flow out to the gas passage portion.

The vehicle curtain airbag apparatus of the above publication uses an inner tube having a tube body that is long in the front-rear direction of the vehicle, so that the end portions of the airbag body in the vehicle front-rear direction are deployed and inflated at an early stage.

In an airbag that has an airbag body formed by hollow weave and an inner tube formed separately from the airbag body, the inner tube is arranged inside the airbag body by inserting the inner tube into a connection portion and a gas passage portion from a connection port provided in the connection portion.

However, if the tube body is long as in the case of the inner tube disclosed in the above publication, it is difficult to insert the inner tube into the connection portion and the gas passage portion while maintaining a straightly extended state of the tube body. This is because the tube body is easily deformed, for example, bent during insertion. It is thus troublesome to insert an inner tube to a target position in a connection portion and a gas passage portion.

SUMMARY OF THE INVENTION

It is an objective of the present disclosure to provide a vehicle curtain airbag apparatus that is configured to facilitate insertion of an inner tube into an airbag body.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a vehicle curtain airbag apparatus is provided that includes an inflator including a gas outlet portion, and an airbag that is configured to be deployed and inflated toward a space between an occupant and a side wall of a vehicle from a section above the side wall by inflation gas supplied from the gas outlet portion. The airbag includes an airbag body, an inner tube, and a pocket portion. The airbag body includes a gas passage portion that extends in a front-rear direction of the vehicle and a connection portion, an internal space of the connection portion being continuous with the gas passage portion, and the inflator being connected to the connection portion. The inner tube is configured to be arranged inside the airbag body by being inserted into a connection port provided at the connection portion. The inner tube includes a tube body and an insertion portion. The tube body is arranged inside the gas passage portion and includes at least one gas outflow port. The insertion portion is arranged inside the connection portion with an internal space of the insertion portion being continuous with an internal space of the tube body, at least the gas outlet portion of the inflator being inserted into the insertion portion. The pocket portion is provided in a front end portion of the tube body in an insertion direction in which the inner tube is inserted into the airbag body. The pocket portion is configured such that an insertion aid that guides insertion of the inner tube into the airbag body is inserted into the pocket portion. A front end portion of the pocket portion in the insertion direction is joined to the tube body at a first joint portion that extends in an intersecting direction. The intersecting direction intersects the insertion direction. At least one of end portions of the pocket portion in the intersecting direction is joined to the tube body at a second joint portion that extends in the insertion direction.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A vehicle curtain airbag apparatus 20 according to a first embodiment will now be described with reference to FIGS. 1 to 18.

In the following description, the front and the rear are defined with reference to the front-rear direction of the vehicle. The center of the vehicle in the width direction (the vehicle width direction) is used as a point of reference. In relation to a given point in the vehicle, the side closer to the center than that point will be referred to as an inward side of that point, while the side farther from the center than that point will be referred to as an outward side of that point. This also applies to a second embodiment and various modifications, which will be discussed below.

It is now assumed that an occupant having a size equivalent to a crash test dummy is seated in a predetermined normal posture in the vehicle seat. The crash test dummy is, for example, the AM50 (the model that covers 50% of the American adult male population) of the WorldSID program, and is referred to as an AM50 dummy.

Figure 1:
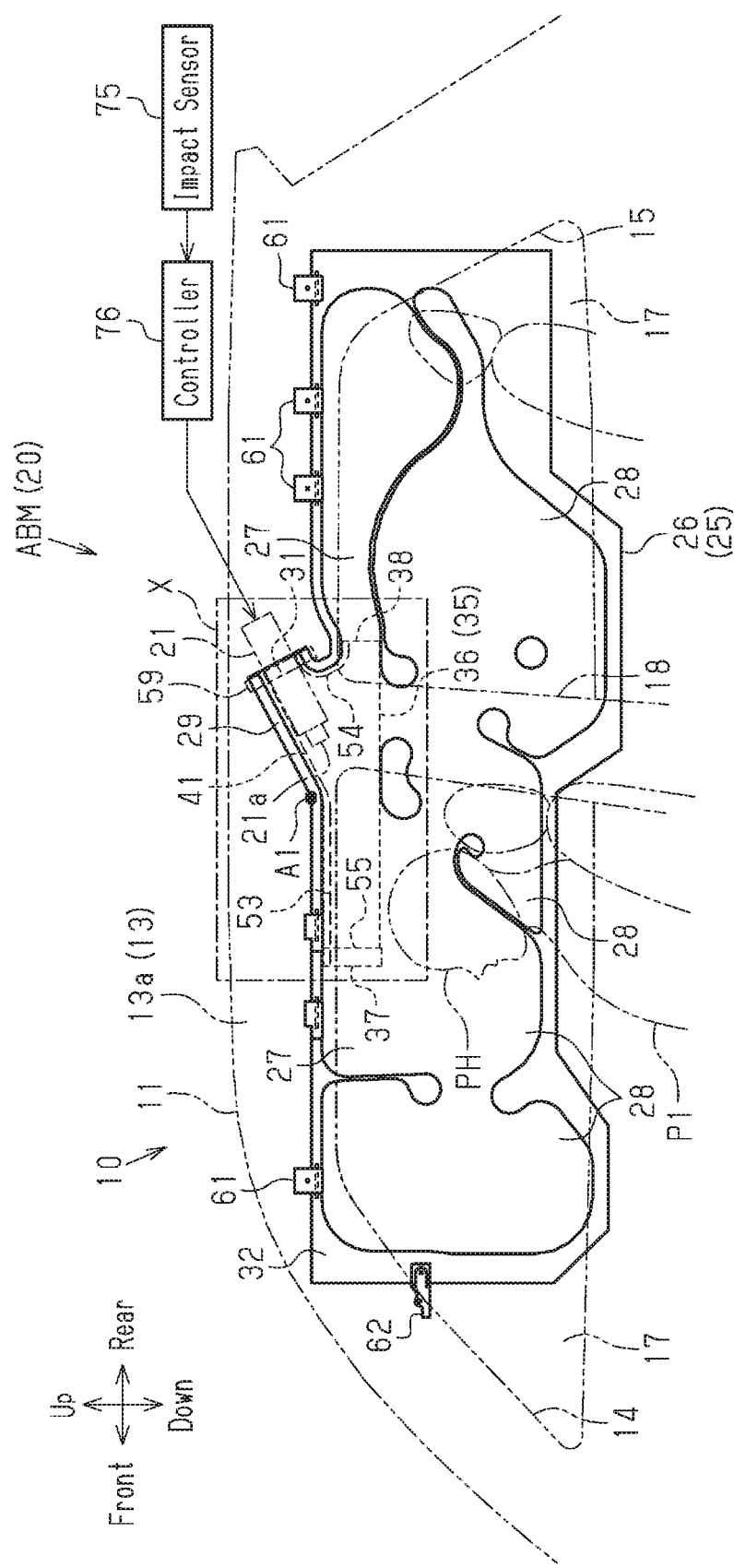
FIG. 1 is a side view of a vehicle curtain airbag apparatus according to a first embodiment.

As shown in FIG. 1, the main part of the vehicle curtain airbag apparatus (hereinafter, simply referred to as "airbag apparatus") 20 is formed by an airbag module ABM. The airbag module ABM includes an inflator 21 and an airbag 25. A vehicle body 11 includes an accommodation portion above a side wall. The airbag module ABM is accommodated and arranged in the accommodation portion. The side wall is one of the sections that form the opposite sides, in the vehicle width direction, of the vehicle body 11, and includes front and rear side windows 17 and a center pillar garnish 18. The accommodation portion is formed by the components described below:

the space between a roof side rail (not shown) and an end portion 13a on the outward side of a roof headlining 13, which is a molded ceiling, the space between a front pillar (not shown) and a front pillar garnish 14 arranged on the inward side of the front pillar, and the space between a rear pillar (not shown) and a rear pillar garnish 15 arranged on the inward side of the rear pillar.

The roof side rail forms a part of the framework of the vehicle body 11 and is arranged to extend in the front-rear direction in the opposite end portions on the outward side of the vehicle roof (not shown). The front pillar garnish 14 is an interior part with which the front pillar is lined from the inward side. The front pillar forms part of the framework. The rear pillar garnish 15 is an interior part with which the rear pillar is lined from the inward side. The rear pillar forms part of the framework.

The inflator 21 is substantially columnar. The inflator 21 incorporates a gas generating agent, which generates inflation gas. The inflator 21 is inclined to be higher toward the rear end. The inflator 21 has a gas outlet portion 21a in the lower front end portion. A harness (not shown), which is wiring for applying activation signals to the inflator 21, is connected to the rear upper end portion of the inflator 21. The inflator 21 is attached to the vehicle body 11 in the accommodation portion.

The airbag 25 is deployed and inflated toward the space between an occupant P1 and the side wall from the accommodation portion by inflation gas supplied from the inflator 21. FIG. 1 shows the airbag 25 being spread in a flat form without being filled with inflation gas.

The airbag 25 includes an airbag body 26, an inner tube 35, pocket portions 55, attachment tabs 61, and a tension belt 62. The components of the airbag 25 will now be described.

<Airbag Body 26>

The shape and the size of the airbag body 26 are determined such that the airbag body 26 can protect the upper body, chiefly the head PH, of the occupant P1, when the airbag body 26 is deployed and inflated. The airbag body 26 as a whole has a shape of a horizontal rectangle that extends in the front-rear direction. The airbag body 26 is formed by hollow weave using fibers of polyamide or polyester, so as to have a high strength and flexibility.

Figure 12:
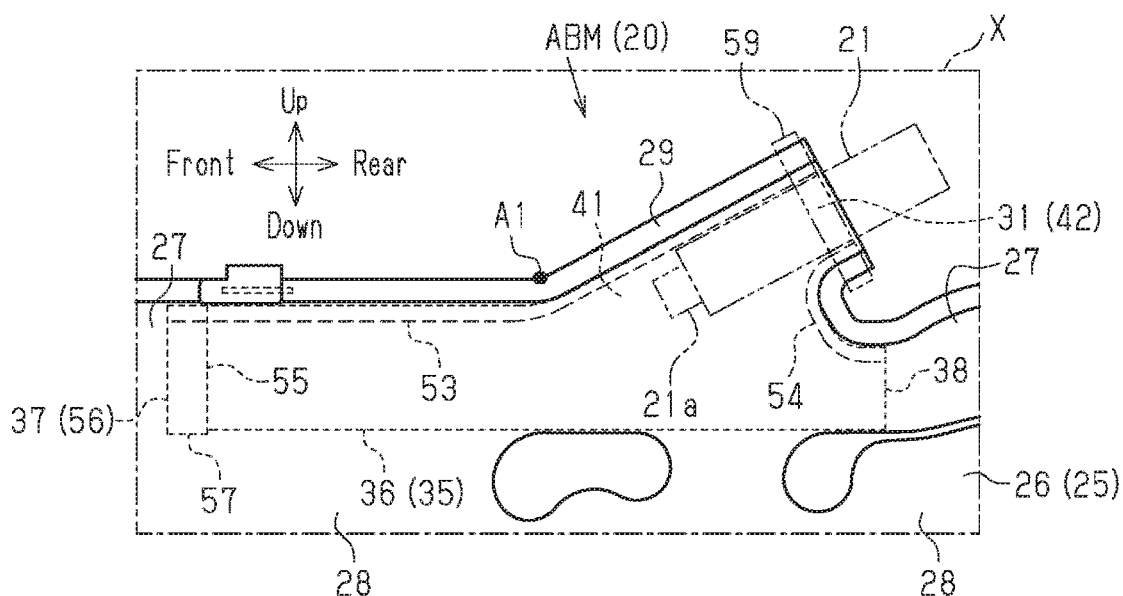
FIG. 12 is an enlarged partial side view showing section X in FIG. 1.

As shown in FIGS. 1 and 12, the airbag body 26 includes a gas passage portion 27, inflation portions 28, a connection portion 29, and a non-inflation portion 32.

The gas passage portion 27 is located in the upper end portion in the airbag body 26 and extends in the front-rear direction. The inflation portions 28 are located, for example, below the gas passage portion 27, while being arranged along the front-rear direction. Each inflation portion 28 is directly or indirectly continuous with the gas passage portion 27.

The inflator 21 is connected to the connection portion 29, which is located above a substantially center portion of the gas passage portion 27 in the front-rear direction. The connection portion 29 is inclined to be higher toward the rear end. The connection portion 29 is connected to the gas passage portion 27, with the internal spaces continuous with each other, in the lower front end portion of the connection portion 29. The connection portion 29 includes a connection port 31 in the rear upper end portion.

The non-inflation portion 32 is neither supplied with inflation gas nor inflated. The non-inflation portion 32 is formed by part of the airbag body 26 that is different from the gas passage portion 27, the inflation portions 28, and the connection portion 29.

<Inner Tube 35>

The inner tube 35 is formed separately from the airbag body 26 and provided for the following purposes:

to conduct inflation gas supplied from the inflator 21 to different parts of the airbag body 26; and to improve the heat resistance of part of the airbag body 26 that surrounds the gas outlet portion 21a, thereby preventing that part from being affected by the heat of the inflation gas.

Figure 2:
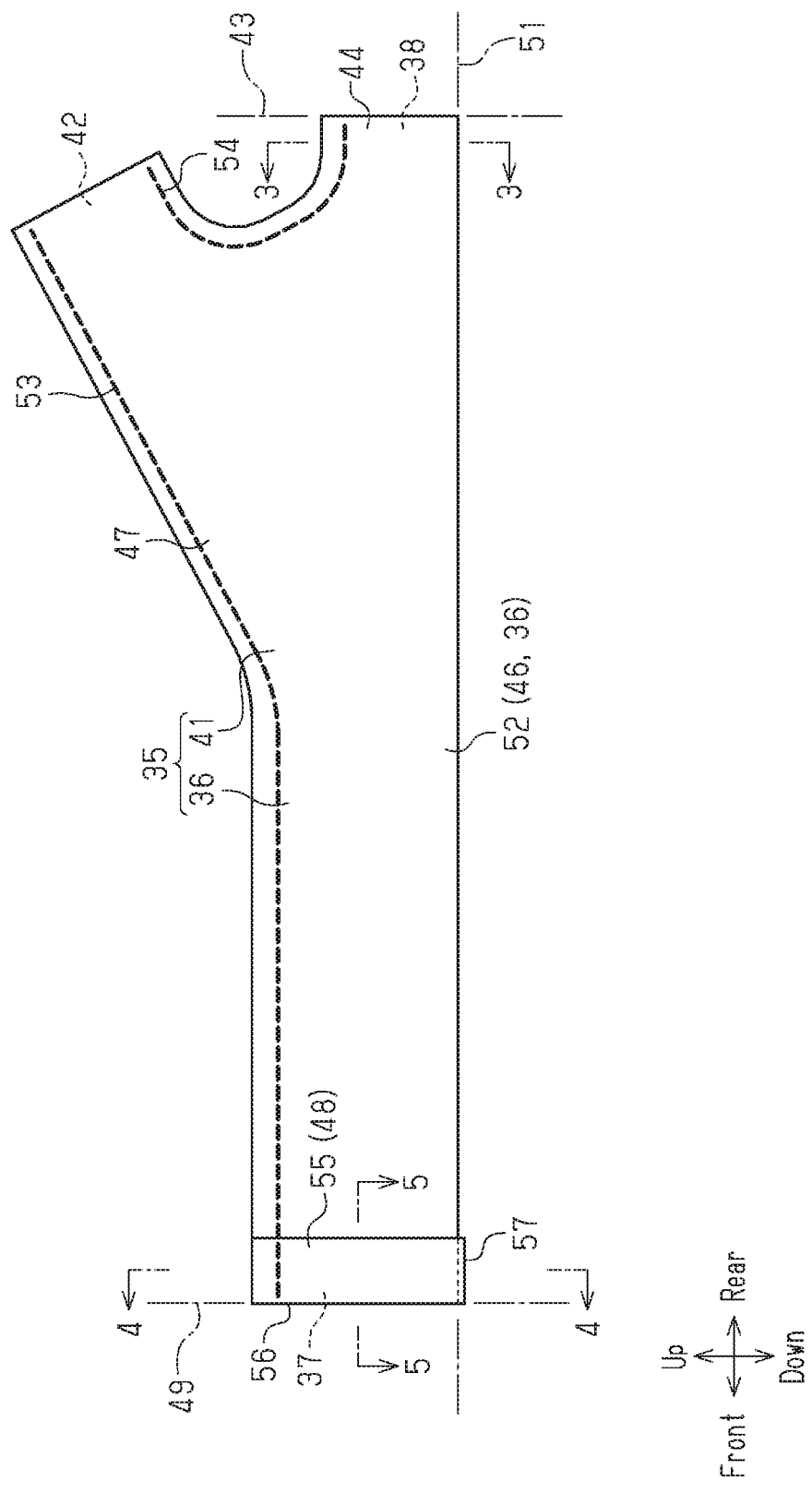
FIG. 2 is aside view of an inner tube according to the first embodiment.
Figure 3:
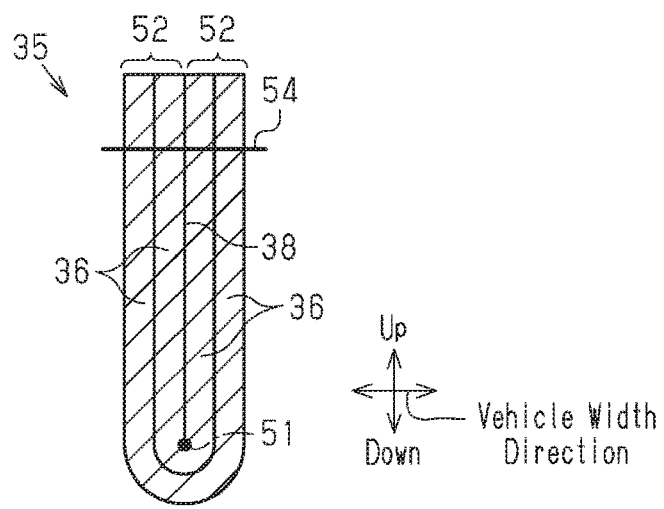
FIG. 3 is a cross-sectional view taken along line 3-3 of FIG. 2.

As shown in FIGS. 2 and 12, the inner tube 35 is inserted from the connection port 31 to be arranged in the airbag body 26. The inner tube 35 is made of the same material as the airbag body 26. The inner tube 35 includes a tube body 36 and an insertion portion 41.

The tube body 36 has an elongated shape extending in the front-rear direction in correspondence with the gas passage portion 27, and is arranged in the gas passage portion 27.

At least the gas outlet portion 21a of the inflator 21 is inserted into the insertion portion 41. In correspondence with the connection portion 29, the insertion portion 41 is inclined to be higher toward the rear end. Both end portions of the insertion portion 41 are open. The opening at the rear upper end portion of the insertion portion 41 forms an insertion port 42. The insertion portion 41 is connected to the tube body 36, with the internal spaces being continuous with each other, and is arranged in the connection portion 29.

The tube body 36 includes a gas outflow port 37 in the front end portion and a gas outflow port 38 in the rear end portion. Inflation gas supplied to the tube body 36 flows out to the gas passage portion 27 from the gas outflow ports 37, 38.

The inner tube 35, which is configured as described above, includes two fabric portions 44, 45, which are connected to each other at a folding line 43 as shown in FIGS. 6 to 9. The shapes of the fabric portions 44, 45 are substantially symmetrical with respect to the folding line 43.

Figure 6:
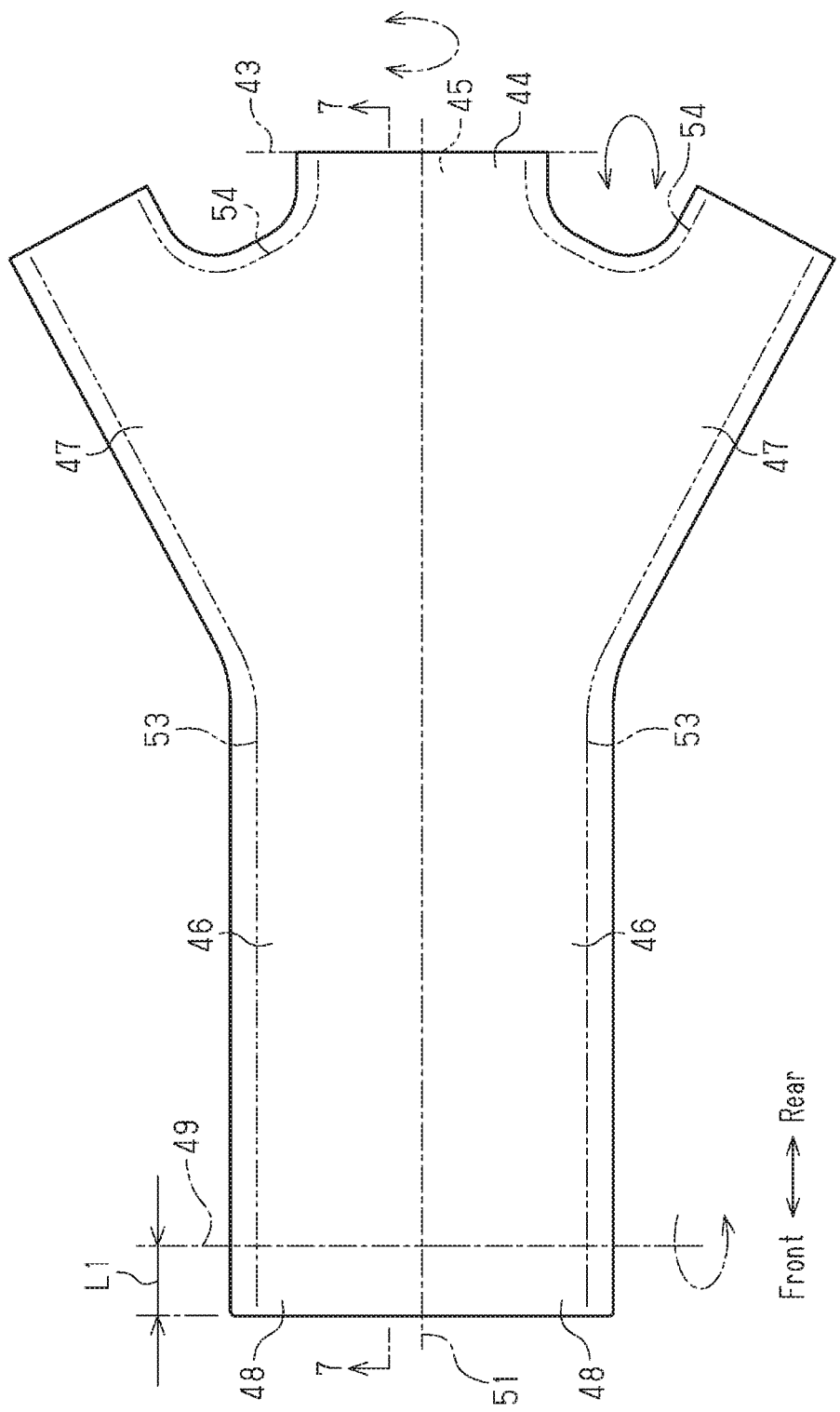
FIG. 6 is a developed view illustrating a form of the inner tube according to the first embodiment in the process of manufacture.
Figure 7:
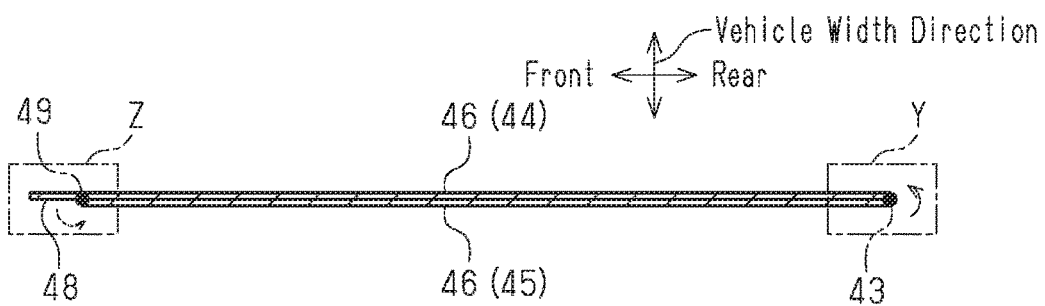
FIG. 7 is a cross-sectional view taken along line 7-7 of FIG. 6.
Figure 8:
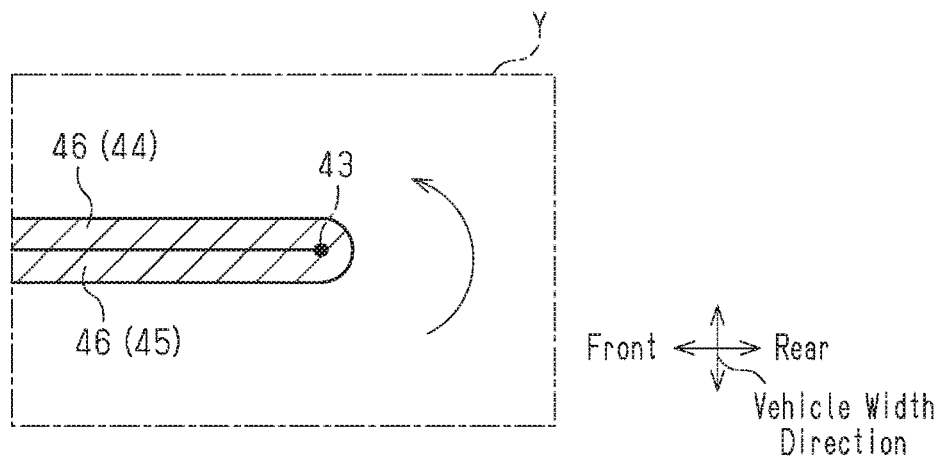
FIG. 8 is an enlarged partial cross-sectional view showing section Y in FIG. 7.
Figure 9:
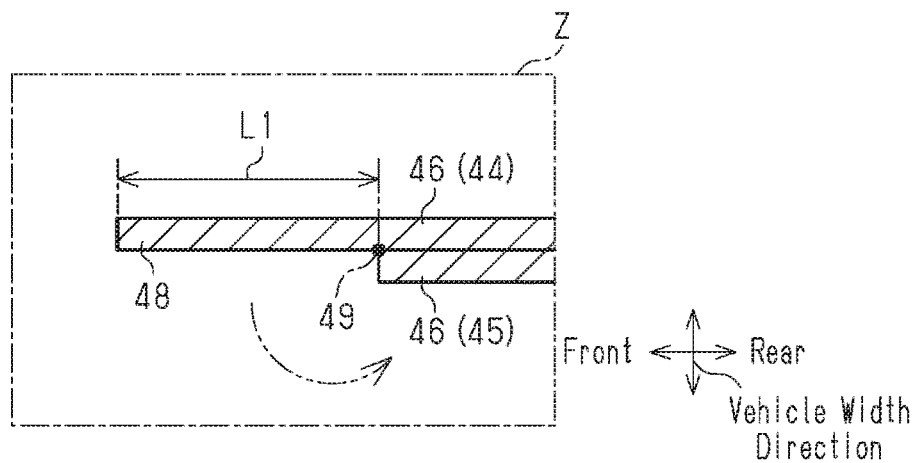
FIG. 9 is an enlarged partial cross-sectional view showing section Z in FIG. 7.

The fabric portions 44, 45 are folded along the folding line 43 to be overlapped with each other in a direction orthogonal to the sheet of FIG. 6 and in the vertical direction as viewed in FIG. 7. The fabric portions 44, 45 have slightly different shapes. The fabric portions 44, 45 commonly include component fabric portions 46, which form the tube body 36, and component fabric portions 47, which form the insertion portion 41. Unlike the fabric portion 45, the fabric portion 44 includes component fabric portions 48, which form the pocket portions 55, in the front end portion of the component fabric portion 46. The pocket portions 55 will be discussed below. Thus, in the front-rear direction, the fabric portion 44 is longer than and extends further forward than the fabric portion 45 by a length L1 of the component fabric portions 48.

Figure 10:
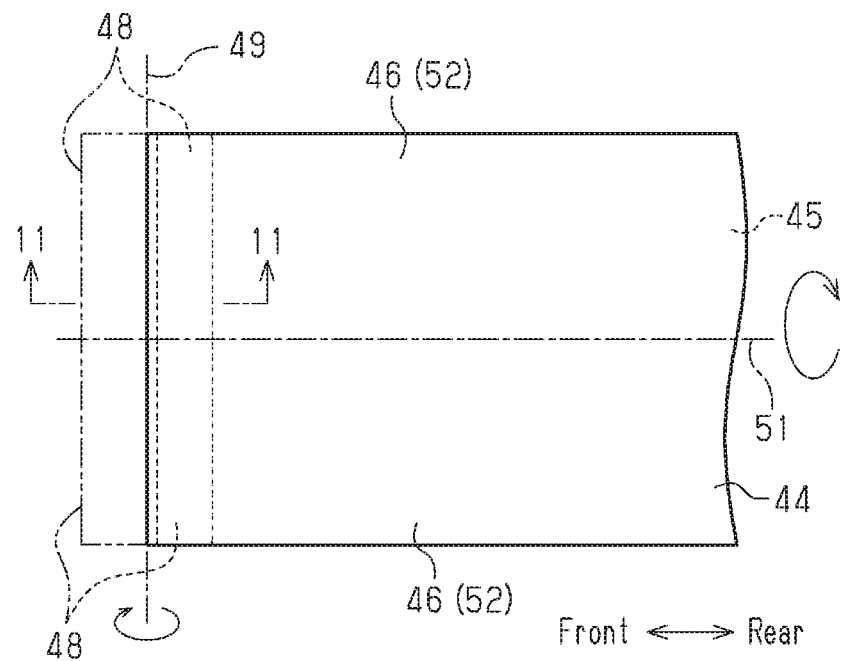
FIG. 10 is a partially developed view illustrating a different form of the inner tube according to the first embodiment in the process of manufacture.
Figure 11:
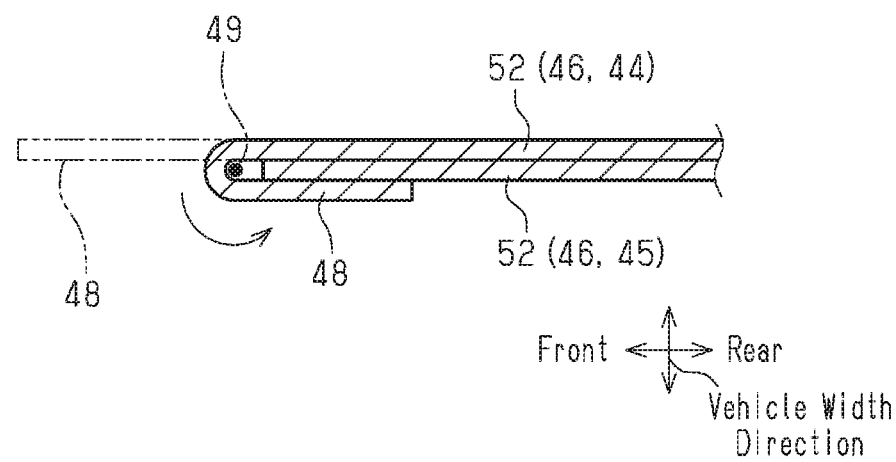
FIG. 11 is a partial cross-sectional view taken along line 11-11 of FIG. 10.

The fabric portion 44 has a folding line 49, which is parallel with the folding line 43, at the boundary between the component fabric portions 46 and 48. As shown in FIGS. 10 and 11, the component fabric portions 48 are folded along the folding line 49 toward the fabric portion 45 to be overlapped with the front end portion of the component fabric portion 46 of the fabric portion 45.

As described above, the fabric portions 44, 45 are folded along the folding line 43, and the component fabric portions 48 are folded back along the folding line 49. The fabric portions 44, 45 further has a folding line 51 as shown in FIG. 10. The folding line 51 extends in the front-rear direction, which is orthogonal to the folding lines 43, 49. The fabric portions 44, 45 have portions 52 that are located on the opposite sides of the folding line 51. The portions 52 are symmetric with respect to the folding line 51. As shown in FIGS. 10 and 11, the portions 52 are folded along the folding line 51 to be overlapped with each other in the vehicle width direction. The folded-back component fabric portions 48 are located at the outermost positions in the vehicle width direction in the overlapped portions 52 (refer to FIGS. 4 and 5).

The portions 52, which are overlapped with each other in the vehicle width direction as described above, are joined to each other at peripheral joint portions 53, 54 provided at the peripheries except for specific sections. The specific sections include sections adjacent to the folding line 51, the front and rear end portions of the component fabric portion 46, and the rear upper end portion of the component fabric portion 47.

In the first embodiment, the peripheral joint portions 53, 54 are formed by sewing peripheral parts of the portions 52 except for the specific sections. This also applies to first joint portions 56 and second joint portions 57 in modifications discussed below.

Sewn portions in FIGS. 1, 2, 12 to 15, 17, 19 to 22, 24, and 25 are represented by first and second types of lines. The first type of line includes thick line segments with a certain length arranged intermittently and represents sewn portions as viewed from the side. For example, the peripheral joint portions 53, 54 in FIG. 2 correspond to the first type of line. The second type of line includes thin line segments of a certain length (longer than those in a typical broken line) arranged intermittently, and represents the state of sewing threads that are located, for example, between the portions 52 and cannot be seen directly. For example, the peripheral joint portions 53, 54 in FIG. 12 correspond to the second type of line.

The peripheral joint portions 53, 54 may be formed by a method other than sewing using sewing threads, but may be formed by, for example, using adhesive. This also applies to the first joint portions 56 and the second joint portion 57.

As shown in FIGS. 2 to 5, the portions 52, which are overlapped with each other in the vehicle width direction, are joined to each other at the peripheral joint portions 53, 54, to form the inner tube 35, which includes the tube body 36 and the insertion portion 41. The tube body 36 includes the gas outflow ports 37, 38 in the front and rear end portions. The insertion portion 41 includes the insertion port 42 in the rear upper end portion. In addition, two pocket portions 55 are formed.

<Pocket Portions 55>

Figure 4:
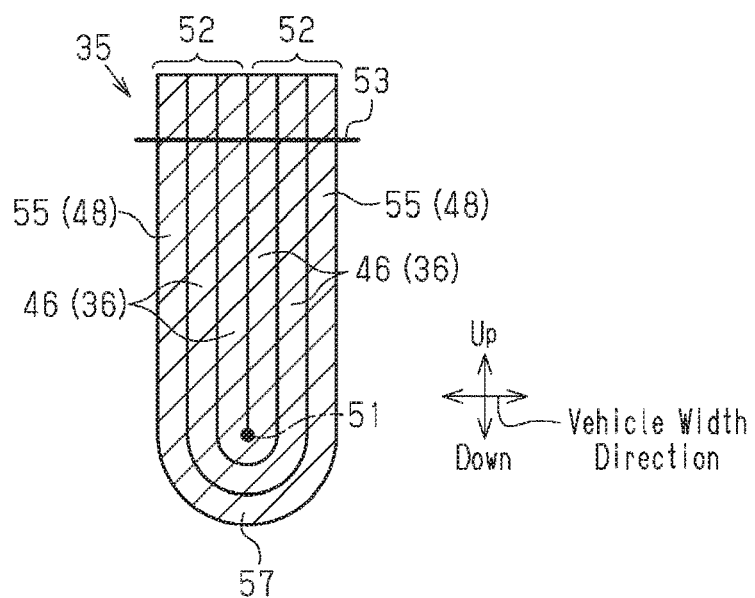
FIG. 4 is a cross-sectional view taken along line 4-4 of FIG. 2.
Figure 5:
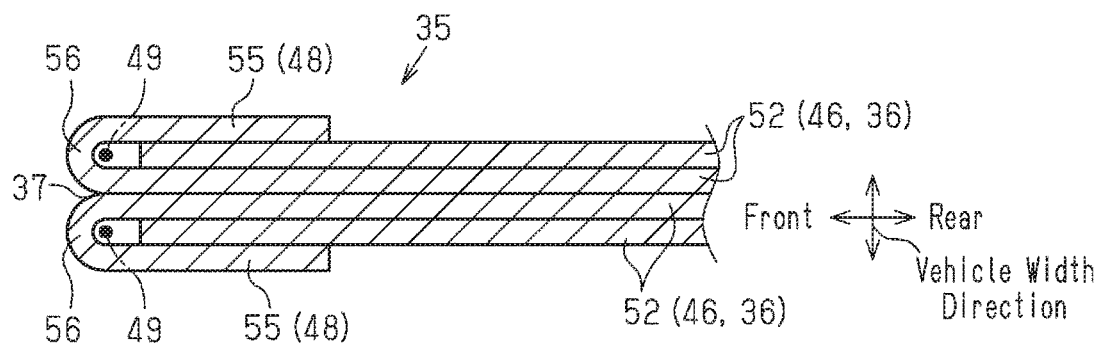
FIG. 5 is a partial cross-sectional view taken along line 5-5 of FIG. 2.
Figure 13:
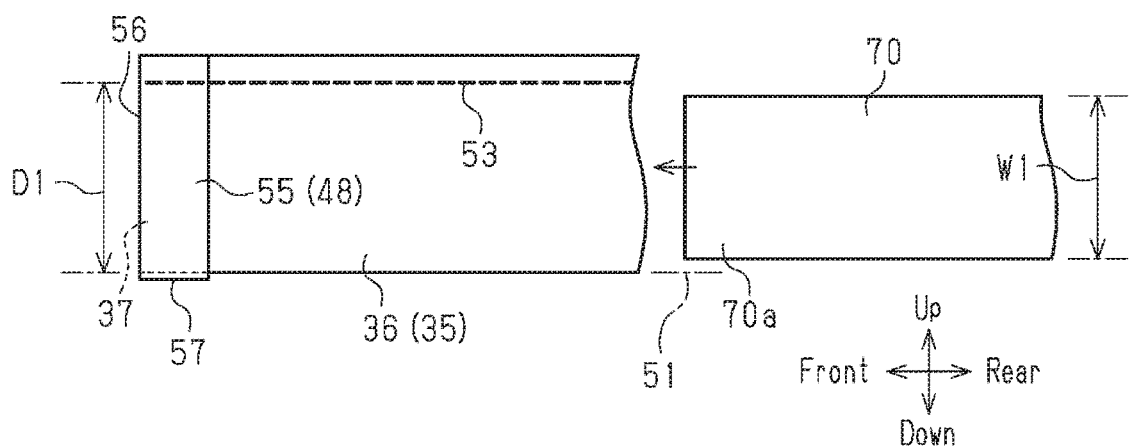
FIG. 13 is a partial side view illustrating a state before an insertion aid is inserted between a pocket portion and a tube body in the first embodiment.
Figure 14:
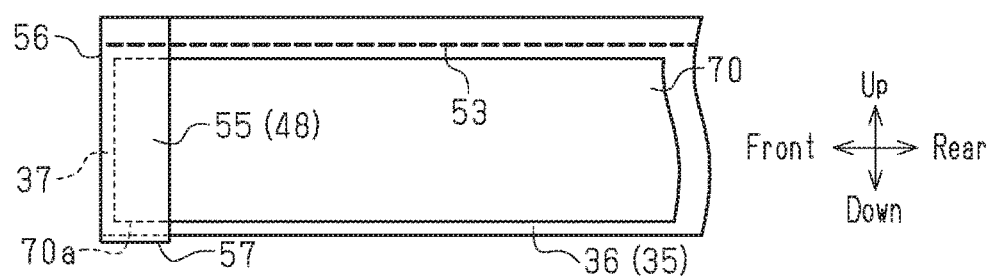
FIG. 14 is a partial side view illustrating a state after the insertion aid is inserted between a pocket portion and a tube body in the first embodiment.

The pocket portions 55 are sections into which a distal portion 70a of an insertion aid 70 shown in FIG. 13 is inserted. The pocket portions 55 are formed by the component fabric portions 48. The insertion aid 70 is designed to guide insertion of the inner tube 35 into the airbag body 26. The details of the insertion aid 70 will be discussed below. As shown in FIGS. 4 and 5, the pocket portions 55 are located outside the tube body 36 and in the front end portion of the tube body 36. In the first embodiment, the pocket portions 55 are formed to sandwich the tube body 36 from the opposite sides in the vehicle width direction.

The direction in which the inner tube 35 is inserted into the connection portion 29 is a direction from the connection port 31 toward a front end portion A1 of the connection portion 29 and substantially matches with the front-rear direction. Also, the direction in which the tube body 36 is inserted into the gas passage portion 27 is a direction from the rear end portion toward the front end portion of the gas passage portion 27. Thus, when the positional relationship between different portions are described with reference to the insertion direction of the inner tube 35, the positional relationship will be descried in terms of front-rear relationship. For example, the front side in the insertion direction will simply be referred to as a "front side," and the rear side in the insertion direction will simply be referred to as a "rear side."

The front end portion of the tube body 36 is located at a position that is forward of the front end portion A1 of the connection portion 29. At this position, insertion of the front end portion of the tube body 36 would be difficult if no measures were taken during insertion of the inner tube 35 into the airbag body 26 from the connection port 31.

An airbag apparatus of a comparative example will now be described. This airbag apparatus includes an inner tube that includes an insertion portion and a tube body. The insertion portion is located forward or rearward of the tube body and extends in the front-rear direction. The inner tube is inserted into the airbag body in a single direction without changing the direction. This type of airbag apparatus also has a position at which insertion of the front end portion of the tube body would be difficult if no measures were taken during insertion of the inner tube into the airbag body from the connection port.

The distance from the connection port to the position at which insertion would be difficult is shorter in the first embodiment than in the comparative example. This is due to the following difference between the comparative example and the first embodiment. That is, in the comparative example, the inner tube is inserted in the single direction. In the first embodiment, the insertion direction needs to be slightly changed after the inner tube passes the front end portion A1. Such a change in the insertion direction hinders the insertion of the front end portion of the tube body 36.

Figure 18:
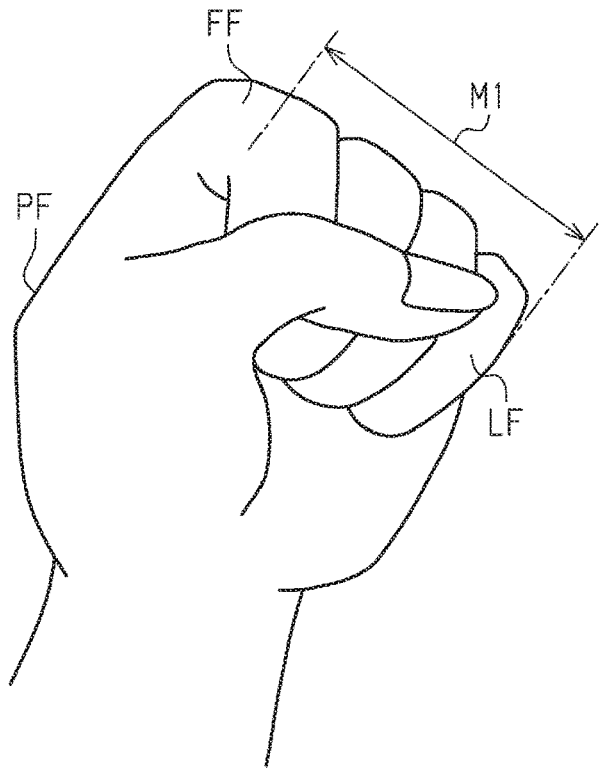
FIG. 18 is a perspective view showing the relationship between the fist of an AM50 dummy and a measurement M1 in the first embodiment.

The above-described position of the front end portion of the tube body 36 meets the following condition. As shown in FIG. 18, the fist PF of the AM50 dummy is used as a reference. When the fist PF is made, the measurement from the outer surface of the forefinger FF to the outer surface of the little finger LF in the arrangement direction of the fingers is defined as a measurement M1. As shown in FIG. 12, the front end portion of the tube body 36 is located at a position that is spaced apart forward from the connection port 31 by a distance longer than twice the measurement M1. This position would also be difficult to reach by the front end portion of the tube body 36 if no measures were taken during insertion of the inner tube 35 into the airbag body 26 from the connection port 31.

As described above, the pocket portions 55 are formed integrally with the tube body 36 and overlapped in the vehicle width direction with the front end portion of the tube body 36.

As shown in FIGS. 2 to 5, the front end portions of the pocket portions 55 are joined to the tube body 36 at first joint portions 56, which extend in an intersecting direction, which intersects the front-rear direction. The component fabric portions 48, 46, which are formed integrally and made of the same material, are connected to each other at the front edges. The connected front edges form the first joint portions 56. In this case, the intersecting direction is the vertical direction, which is orthogonal to the front-rear direction.

The upper end portion of each pocket portion 55, which is one of the end portions in the vertical direction, is joined to the tube body 36 at one of second joint portions, which extend in the front-rear direction. In the first embodiment, the second joint portions are formed by the front end portion of the above-described peripheral joint portion 53 (refer to FIG. 4).

The lower end portion of each pocket portion 55, which is the other end portion in the vertical direction, is joined to the adjacent pocket portion 55 at the other one of the second joint portions, which extends in the front-rear direction. The component fabric portions 48 are connected to each other at the lower end portions, and the connected lower end portions form the second joint portion 57. The second joint portion 57 extends in the front-rear direction, which is orthogonal to the vertical direction.

As shown in FIGS. 1 and 12, the inner tube 35 and the airbag body 26 are fastened to the inflator 21 by a clamp 59, which is attached to a section of the connection portion 29 around the connection port 31.

<Attachment Tabs 61 and Tension Belt 62>

As shown in FIG. 1, the attachment tabs 61 are arranged at multiple positions separated from each other in the front-rear direction. Each attachment tab 61 is joined to the upper end portion of the airbag body 26 by a joining means such as sewing. The rear end portion of the tension belt 62 is also joined to the front end portion of the airbag body 26 by the same joining means.

Before being installed in the vehicle 10, the airbag 25 is folded in the vertical direction, so that the above-described airbag module ABM is made into a compact form that is small in the vertical direction and elongated in the front-rear direction. The airbag 25 is held in a folded form by a fastening member such as a tape. As the fastening member, a component that is broken when the airbag 25 is deployed and inflated is used.

When installed in the vehicle 10, the airbag module ABM is accommodated in the accommodation portion. The airbag module ABM is attached to the accommodation portion at the attachment tabs 61 and to the front pillar in the front end portion of the tension belt 62.

The airbag apparatus 20 further includes an impact sensor 75 and a controller 76 shown in FIG. 1. The impact sensor 75 includes an acceleration sensor and detects an impact applied to the vehicle 10 via the side wall. The controller 76 controls operation of the inflator 21 based on a detection signal from the impact sensor 75.

An operation of the first embodiment, which is configured as described above, will now be described. Advantages that accompany the operation will also be described.

As described above, the airbag body 26 is formed by hollow weave. The inner tube 35 is formed separately from the airbag body 26. To arrange the inner tube 35 inside the airbag body 26, the inner tube 35 needs to be inserted into the airbag body 26.

The connection port 31 of the connection portion 29 is the only section in the airbag body 26 that connects the inside and the outside to each other. Therefore, the inner tube 35 is inserted into the connection portion 29 and the gas passage portion 27 through the connection port 31. More specifically, the inner tube 35 is inserted into the airbag body 26 from the connection port 31 with the front end portion of the tube body 36 being the leading end.

In this case, the front end portion of the tube body 36 needs to be inserted to reach a position forward of the front end portion A1. Furthermore, after the front end portion passes the front end portion A1, the insertion direction needs to be changed slightly. However, being made of fabric and soft, the inner tube 35 has a low stiffness. It is thus difficult to insert the front end portion of the tube body 36 to a target position that is forward of the front end portion A1.

In this regard, the first embodiment uses the insertion aid 70 shown in FIG. 13 during insertion of the inner tube 35 into the airbag body 26. As the insertion aid 70, an object is used that is made of a material having a higher stiffness than the inner tube 35, such as a metal or a plastic. Also, as the insertion aid 70, an object is used that is capable of passing the connection port 31 and being inserted between one of the pocket portions 55 and the tube body 36. In the first embodiment, the insertion aid 70 has a width W1 that is slightly smaller than a distance D1 between the peripheral joint portion 53 and the second joint portion 57. Further, as the insertion aid 70, an object is used that has a length that is longer than the distance from the connection port 31 to a position in the gas passage portion 27 where the front end portion of the tube body 36 will be located. In the first embodiment, the insertion aid 70 is an elongated metal plate that extends linearly in a single direction.

In the insertion process, the insertion aid 70 is held in a state of extending in the front-rear direction behind the pocket portions 55 as shown in FIG. 13. The insertion aid 70 is moved forward so that the distal portion 70*a* is inserted into a space between one of the pocket portions 55 and the tube body 36 and between the peripheral joint portion 53 and the second joint portion 57. Since the stiffness of the front end portion of the tube body 36 is increased by the pocket portions 55, the distal portion 70*a* is easily inserted between one of the pocket portions 55 and the tube body 36.

The pocket portions 55 are located outside the tube body 36 in the vehicle width direction as shown in FIGS. 4 and 5. Thus, the insertion aid 70 can be inserted between one of the pocket portions 55 and the tube body 36 from either side of the tube body 36 in the vehicle width direction. In other words, positions outside the tube body 36 are the opposite sides of the tube body 36 in the vehicle width direction. When the insertion aid 70 is inserted from either one of the opposite sides, the distal portion 70*a* can be inserted between the tube body 36 and one of the pocket portions 55. The distal portion 70*a* is more reliably inserted into one of the pocket portions 55 than in a case in which a pocket portion 55 is provided at only one of the outside positions of the tube body 36. This facilitates insertion of the distal portion 70*a* into one of the pocket portions 55.

Then, when the distal portion 70*a* is further inserted to contact the first joint portions 56, which are the boundaries between the pocket portions 55 and the tube body 36, the front end portion of the tube body 36 and the pocket portions 55 are positioned relative to and engaged with the insertion aid 70.

Figure 15:
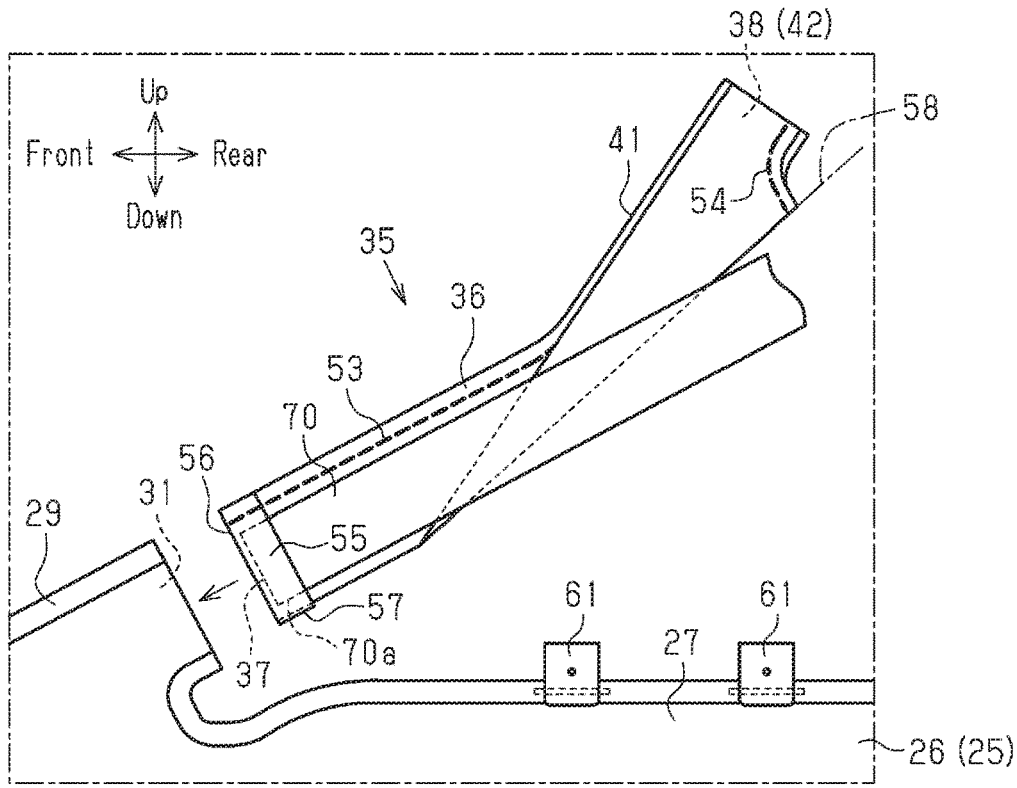
FIG. 15 is a partial side view illustrating a state before the inner tube is inserted into the airbag body using the insertion aid in the first embodiment.
Figure 16:
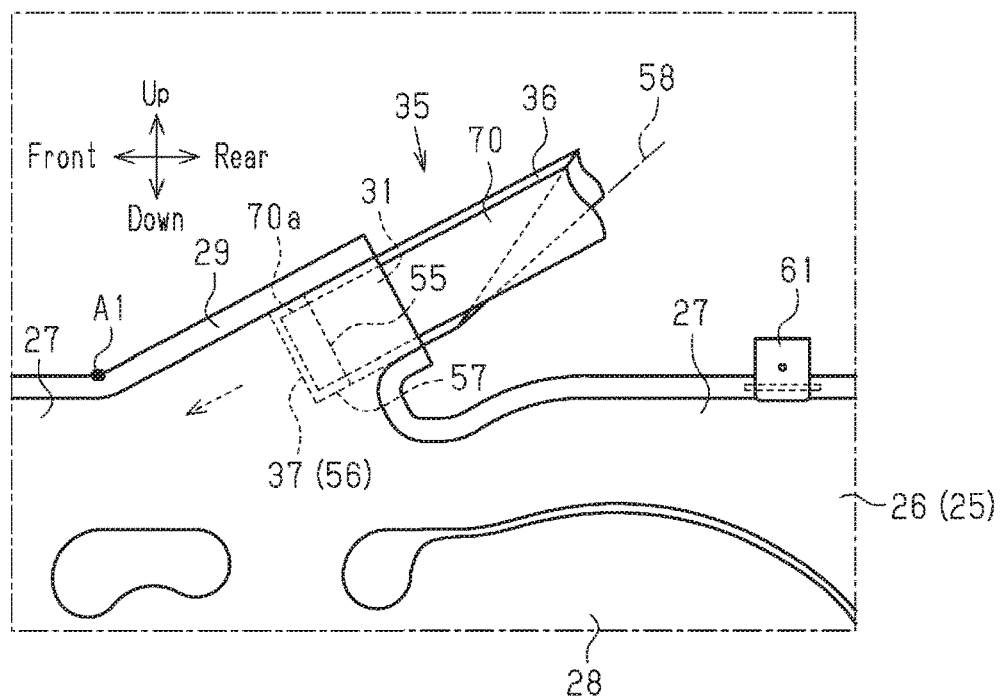
FIG. 16 is a partial side view illustrating a state in which a part of the inner tube has been inserted into the connection portion using the insertion aid in the first embodiment.

Next, as shown in FIG. 15, the positions of the inner tube 35 and the insertion aid 70 are adjusted such that, behind the connection portion 29, the tube body 36 is inclined at an angle substantially equal to the inclination angle of the connection portion 29. As shown in FIG. 16, the front end portion of the tube body 36, which is engaged with the insertion aid 70, is inserted into the connection portion 29 from the connection port 31. At this time, the lower rear part of the inner tube 35 is folded along the folding line 58 to be overlapped with the insertion portion 41 in the vehicle width direction.

Then, the insertion aid 70 is inserted toward the front end portion A1 from the connection port 31. The first joint portions 56 are pushed forward and downward by the insertion aid 70, so that the inner tube 35 is inserted toward the front end portion A1 from the connection port 31 together with the insertion aid 70.

Having a higher stiffness than the inner tube 35, the insertion aid 70 can be inserted into the connection portion 29 without being bent. As described above, the inner tube 35 itself is made of fabric and soft (has a low stiffness). However, during insertion of the insertion aid 70, the inner tube 35 being engaged with the insertion aid 70 at one of the pocket portions 55 is inserted toward the front end portion A1 together with the insertion aid 70. During the insertion, the insertion portion 41 is also inserted into the connection portion 29. At this time, since the lower rear part of the tube body 36 is folded and overlapped with the insertion portion 41, this part and the insertion portion 41 are smoothly inserted into the connection portion 29.

Since the pocket portions 55 are attached to the front end portion of the tube body 36, a part of the inner tube 35 that is located rearward of the pocket portions 55 is also inserted into the airbag body 26.

After passing the front end portion A1, the insertion aid 70 keeps being inserted. The insertion causes the distal portion 70*a* of the insertion aid 70 to move to the gas passage portion 27 from the connection portion 29 together with the inner tube 35. Accordingly, the front end portion of the tube body 36 can be inserted to the target position, which is forward of the front end portion A1 and located in the gas passage portion 27. Particularly, the distal portion 70*a* is surrounded on three sides by the first joint portions 56 and the two second joint portions (the peripheral joint portion 53 and the second joint portion 57). Thus, when the pocket portions 55 attempt to move relative to the insertion aid 70, one or more joint portions abut the insertion aid 70. This restricts movement of the tube body 36 and the pocket portions 55 relative to the insertion aid 70. When the insertion aid 70 is inserted into the airbag body 26, the pocket portions 55 and the front end portion of the tube body 36 are prevented from wobbling and coming off the distal portion 70*a*.

Figure 17:
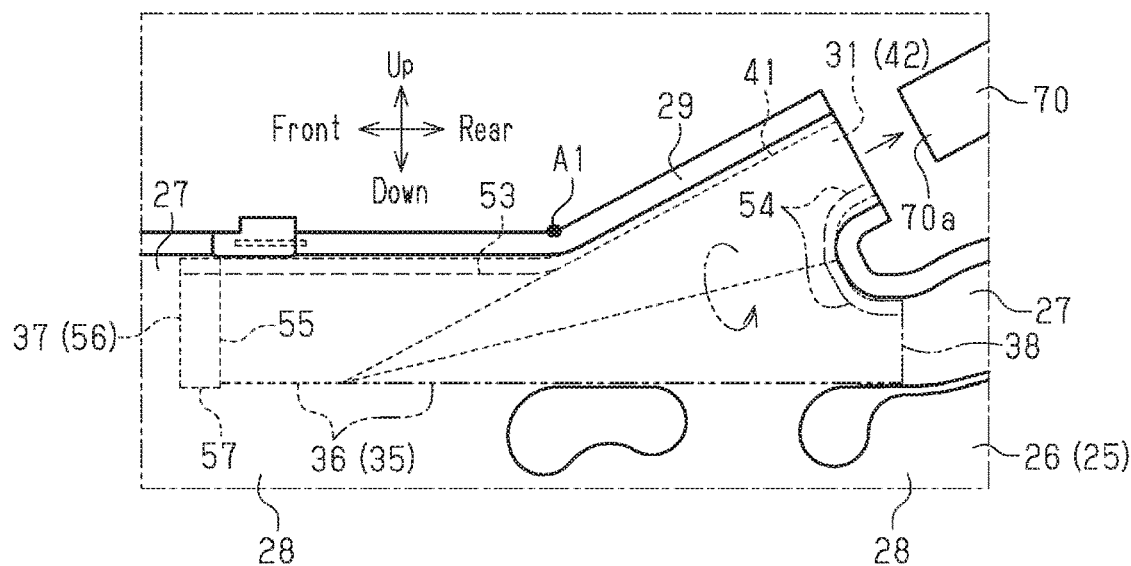
FIG. 17 is a partial side view illustrating a state in which the entire inner tube has been inserted into the airbag body, and the insertion aid has been removed from the airbag body, in the first embodiment.

Thereafter, the insertion of the insertion aid 70 and the inner tube 35 is stopped. The insertion aid 70 is moved in a direction opposite to the insertion direction. The pocket portions 55 and the tube body 36 stop receiving the pressing force of the insertion aid 70. The frictional force produced between the gas passage portion 27 and the inner tube 35 and the frictional force produced between the connection portion 29 and the inner tube 35 attempt to maintain the inner tube 35 at the arranged position. Therefore, the movement in the direction opposite to the insertion direction removes the insertion aid 70 from the airbag body 26 as shown in FIG. 17. In this state, the lower rear part of the tube body 36 remains overlapped with the insertion portion 41. The lower rear part of the tube body 36 is located inside both of the connection portion 29 and the gas passage portion 27. In this state, a finger or the like is inserted into the connection portion 29 from the connection port 31 to push the overlapped part downward. This unfolds the lower rear part of the tube body 36 and moves the entire lower rear part to the gas passage portion 27, as indicated by the long dashed double-short dashed lines in FIG. 17.

In this manner, the first embodiment allows the inner tube 35, which is made of fabric and has a low stiffness, to be inserted to the target position in the gas passage portion 27 and the connection portion 29, thereby facilitating the insertion of the inner tube 35 into the airbag body 26.

As described above, since the stiffness of the part of the inner tube 35 where the pocket portions 55 are provided is increased, the positional accuracy of the front end portion of the inner tube 35 in the gas passage portion 27 is increased. Further, the front end portion of the inner tube 35 can be arranged in the above-described position in a stable manner. The position of the front end portion of the inner tube 35 is prevented from varying depending on each airbag 25.

While moving, the vehicle 10 shown in FIGS. 1 and 12 may receive an impact at the side wall due to a side collision, an oblique collision, or the like. When an impact of a magnitude greater than or equal to a predetermined value is applied to the side wall, the impact is detected by the impact sensor 75. Based on the detection signal of the impact sensor 75, the controller 76 outputs an actuation signal for actuating the inflator 21 to the inflator 21.

In response to the activation signal, the inflator 21 discharges inflation gas from the gas outlet portion 21a. After passing the insertion portion 41, the inflation gas is divided into a stream flowing forward and a stream flowing rearward. The tube body 36 is inflated into a substantially cylindrical shape to push the gas passage portion 27 from inside so that the gas passage portion 27 is spread into a substantially cylindrical shape.

The inflation gas, which has been divided into streams in two directions, flows out from the gas outflow ports 37, 38. The inflation gas is supplied to the inflation portions 28 via the gas passage portion 27. The inflation gas starts inflating the inflation portions 28.

The pocket portions 55 are arranged outside the tube body 36. Thus, unlike a case in which the pocket portions 55 are arranged inside the tube body 36, the pocket portions 55 do not hinder the outflow of inflation gas from the gas outflow ports 37, 38. Therefore, the addition of the pocket portions 55 does not reduce the outflow performance. Specifically, the pocket portions 55 do not reduce the amount of inflation gas that flows out from the gas outflow ports 37, 38. The inner tube 35 thus fulfills the original function.

The tube body 36 extends to a position that is forward of the front end portion A1, and the gas outflow port 37 on the front side is located forward of the gas outflow port in a typical tube body. The tube body 36 is thus capable of conducting the inflation gas from the inflator 21 to a relatively forward position, so that the inflation gas flows out from the gas outflow port 37, which is located at a relatively forward position. This allows the front end portion of the airbag body 26 to be deployed and inflated at an early stage.

As described above, the airbag body 26, which is deployed and inflated when supplied with inflation gas, projects downward from the accommodation portion as shown in FIG. 1. The airbag body 26 is deployed and inflated toward the space between the occupant P1 and the side wall. The airbag body 26 protects the upper body, chiefly the head PH, of the occupant P1, from an impact.

In addition to the ones listed above, the first embodiment has the following advantages.

The pocket portions 55 are formed integrally with the tube body 36 and connected to the tube body 36 at the first joint portions 56. This configuration reduces the number of components of the airbag 25 as compared to a case in which the pocket portions 55 are formed by members separate from the inner tube 35.

Also, the pocket portions 55 are joined to the inner tube 35 at small joint sections. This reduces the manufacturing costs of the airbag 25.

Second Embodiment

Next, a vehicle curtain airbag apparatus according to a second embodiment will be described with reference to FIGS. 19 to 21.

Figure 19:
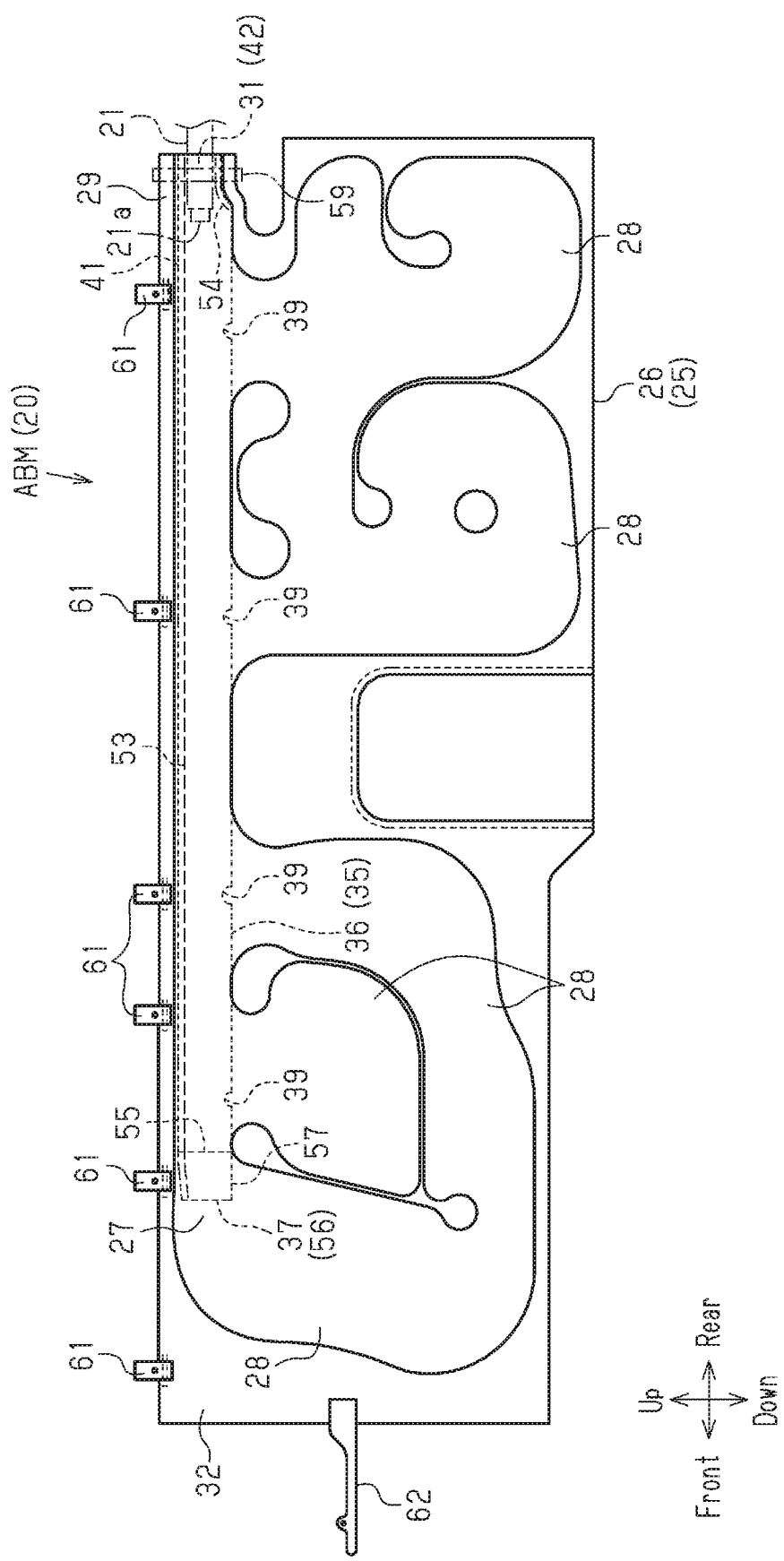
FIG. 19 is a partial side view of an airbag module according to a second embodiment.

In the second embodiment, a connection portion 29 is located rearward of a gas passage portion 27, as shown in FIG. 19. The connection portion 29 extends in the front-rear direction, and the internal space of the connection portion 29 is continuous with the rear end portion of a gas passage portion 27. The connection portion 29 includes a connection port 31 in the rear end portion, which is the end portion on the side far from the gas passage portion 27.

Figure 20:
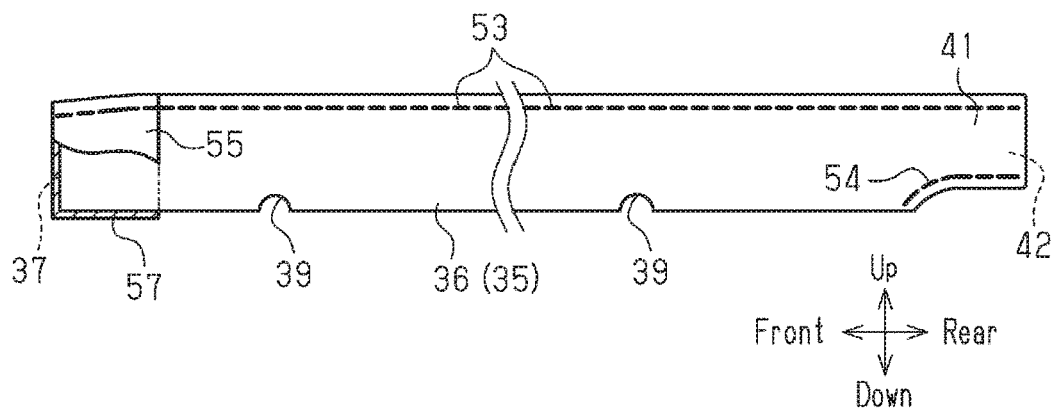
FIG. 20 is a partial side view showing an inner tube according to the second embodiment with a part omitted.
Figure 21:
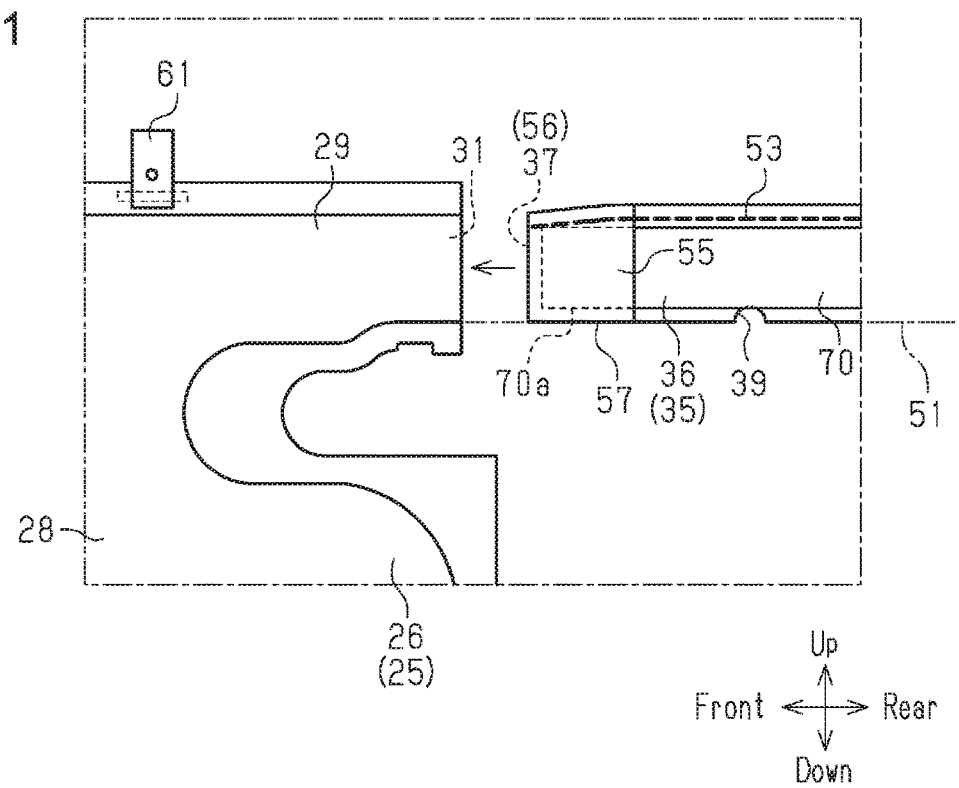
FIG. 21 is a partial side view illustrating a state before the inner tube is inserted into the airbag body using the insertion aid in the second embodiment.

As shown in FIGS. 19 and 20, the tube body 36 extends in the front-rear direction and is arranged in the gas passage portion 27. The tube body 36 of the second embodiment is longer in the front-rear direction than the tube body 36 of the first embodiment. An insertion portion 41 is located rearward of the tube body 36 and extends in the front-rear direction. The internal space of the tube body 36 is continuous with the rear end portion of the tube body 36. The insertion portion 41 is arranged in the connection portion 29.

The inner tube 35 includes the same gas outflow port 37 as that in the first embodiment in the front end portion. Further, the tube body 36 has gas outflow ports 39 at multiple positions separated from each other in the front-rear direction. The gas outflow ports 39 allow inflation gas supplied to the inner tube 35 to flow out downward.

Pocket portions 55 having the same structure as those in the first embodiment are provided in the front end portion of the tube body 36. The pocket portions 55 are joined to the tube body 36 in the same manner as in the first embodiment. The front end portion of the tube body 36 and the pocket portions 55 are located at positions that are forward of the foremost gas outflow port 39. That is, the gas outflow ports 39 are located rearward of the front end portion of the tube body 36 and are separated from each other in the front-rear direction.

Unlike the first embodiment, the inflator 21 is arranged in a state of extending in the front-rear direction. At least the gas outlet portion 21a of the inflator 21 is arranged in the insertion portion 41.

The configuration other than the above is the same as the first embodiment. Thus, in the second embodiment, the same components as those in the first embodiment are given the same reference numerals, and detailed explanations are omitted.

The second embodiment thus achieves the same operations and advantages as the first embodiment. Although the second embodiment uses the inner tube 35 having a shape different from that in the first embodiment, the inner tube 35 is made of fabric and soft. That is, the inner tube 35 has a low stiffness. It is thus difficult to insert the front end portion of the tube body 36 to a target position in the gas passage portion 27. In the second embodiment, the target position is spaced apart forward from the connection port 31 by a distance longer than twice the measurement M1 and is close to the front end portion of the gas passage portion 27.

Particularly, in the second embodiment, since the tube body 36 has the gas outflow ports 39 at the lower part, the stiffness of the tube body 36 is lower than that of the inner tube 35, which does not have the gas outflow ports 39. This tendency becomes more pronounced as the number of the gas outflow ports 39 is increased. Further, the tube body 36 of the second embodiment is longer than the tube body 36 in the first embodiment. It is thus difficult to insert the front end portion of the long tube body 36 to a target position in the gas passage portion 27.

In this regard, the second embodiment uses the same insertion aid 70 as that in the first embodiment during insertion of the inner tube 35. As the insertion aid 70, an object is used that has a length that is longer than the distance from the connection port 31 to a position in the gas passage portion 27 where the front end portion of the tube body 36 will be located.

In the insertion process, the insertion aid 70 is held in a state of extending in the front-rear direction behind the pocket portions 55. The insertion aid 70 is moved forward so that the distal portion 70a is inserted into a space that is located between one of the pocket portions 55 and the tube body 36 and between the peripheral joint portion 53 and the second joint portion 57, as shown in FIG. 21. Then, when the distal portion 70a is further inserted to the first joint portion 56 at the boundary between one of the pocket portions 55 and the tube body 36, the front end portion of the tube body 36 and the pocket portion 55 are positioned relative to and engaged with the distal portion 70a.

The insertion aid 70, and the front end portion of the tube body 36 and the pocket portions 55, which are engaged with the insertion aid 70, are inserted into the connection portion 29 from the connection port 31. In the course of the insertion, the distal portion 70a moves to the gas passage portion 27 from the connection portion 29 together with the inner tube 35. The insertion is stopped when the front end portion of the tube body 36 and the pocket portions 55 are inserted to the target position in the gas passage portion 27.

Thereafter, the insertion aid 70 is moved rearward and removed from the airbag body 26.

In this manner, like the first embodiment, the second embodiment allows the inner tube 35, which is made of fabric and has a low stiffness, to be inserted to the target position in the airbag body 26, thereby facilitating the insertion of the inner tube 35 into the airbag body 26.

Particularly, the above-described advantages are reliably achieved even by the inner tube 35, which has a low stiffness due to the gas outflow ports 39 in the tube body 36.

The front end portion of the inner tube 35 has a relatively high stiffness due to the pocket portions 55 at the front end portion of the tube body 36. The shape of the front end portion of the inner tube 35 is thus easily maintained. Accordingly, insertion into the airbag body 26 is further facilitated as compared to a case in which the pocket portions 55 are not provided.

For the same reason, the positional accuracy of the front end portion of the inner tube 35 in the gas passage portion 27 is increased, and the front end portion of the inner tube 35 is stably arranged at that position. The position of the front end portion of the inner tube 35 is prevented from varying depending on each airbag 25.

The above-described embodiments may be modified as follows. The above-described embodiments and the following modifications can be combined as long as the combined modifications remain technically consistent with each other.

<Modifications to First and Second Embodiments>

The first and second embodiments are not limited to cases in which the airbag body 26 is formed by hollow weave, but are applicable to a case in which the airbag body 26 is formed by joining base fabric pieces together, for example, by sewing. To arrange the inner tube 35 inside the airbag body 26 after the airbag body 26 is formed, the inner tube 35 needs to be inserted into the airbag body 26 as in the above-described embodiments. Even in this case, the same operation and advantages as those in the above-described embodiments are achieved by providing the inner tube 35 with the pocket portions 55.

The pocket portion 55 may be provided only on the inward side or the outward side of the inner tube 35.

The pocket portions 55 may be formed by members separate from the inner tube 35. In this case, it is essential that the pocket portions 55 be joined to the tube body 36 in such a manner that the distal portion 70a of the insertion aid 70 can be inserted into and engaged with the space between the pocket portion 55 and the tube body 36. To meet this requirement, for example, in a case in which the tube body 36 is bent as in the first and second embodiments as shown in FIGS. 22 and 23, the front end portions of the pocket portions 55 may be joined to the tube body 36 at the first joint portions 56, which extend in an intersecting direction, which intersects the front-rear direction.

At least one of the upper and lower end portions of each pocket portion 55 may be joined to the tube body 36 at a second joint portion, which extends in the insertion direction. In FIGS. 22 and 23, the peripheral joint portion 53, which is provided in the upper end portion of the folded tube body 36, is used as one of the second joint portions. That is, the upper end portions of the pocket portions 55 may be sewn together with upper end portion of the tube body 36 at the peripheral joint portion 53 of the first and second embodiments.

Figure 22:
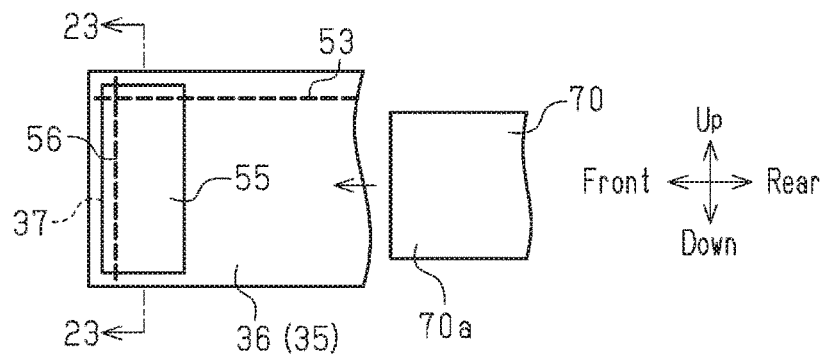
FIG. 22 is a partial side view showing, with a part of an insertion aid, a modification of a pocket portion formed by a member separate from an inner tube.
Figure 23:
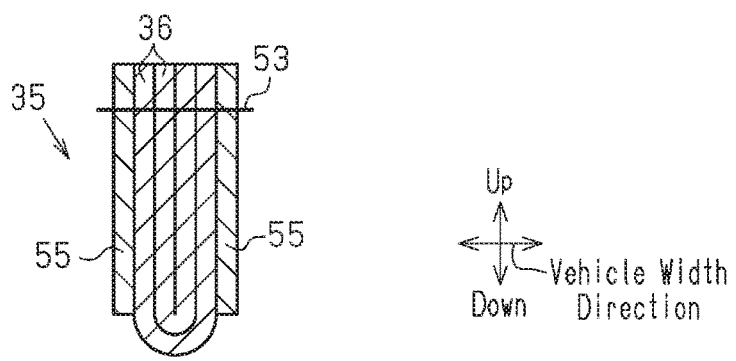
FIG. 23 is a cross-sectional view taken along line 23-23 of FIG. 22.

In FIGS. 22 and 23, the lower end portions of the pocket portions 55 are not joined to the tube body 36. Even in this modification, the distal portion 70a of the insertion aid 70 can be inserted into the space between one of the pocket portions 55 and the tube body 36. In this case, movements of the pocket portions 55 and the inner tube 35 relative to the distal portion 70a are restricted on two sides by the peripheral joint portion 53 and the first joint portions 56. This allows the front end portion of the inner tube 35 to be inserted to the target position in the gas passage portion 27, so that the same operation and advantages as those in the first and second embodiments are achieved.

In addition to the configuration shown in FIGS. 22 and 23, the lower end portions of the pocket portions 55 may be joined to the tube body 36 by the second joint portion 57, which extends in the front-rear direction.

In a case in which the pocket portions 55 are formed by members separate from the inner tube 35, a gas outflow port 39 may be provided at a position directly below the pocket portions 55.

Figure 24:
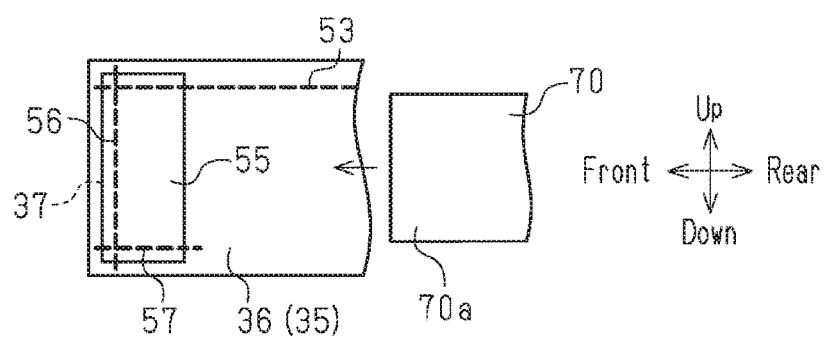
FIG. 24 is a partial side view showing, with a part of an insertion aid, another modification of a pocket portion formed by a member separate from an inner tube.
Figure 25:
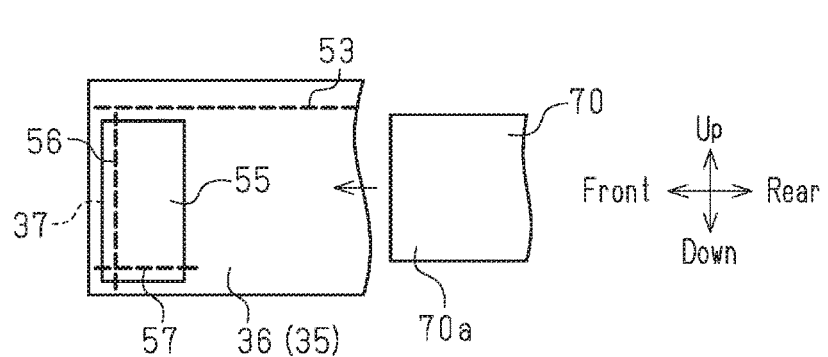
FIG. 25 is a partial side view showing, with a part of an insertion aid, another modification of a pocket portion formed by a member separate from an inner tube.

As shown in FIG. 25, which shows a modification of the configuration in FIG. 24, the upper end portions of the pocket portions 55 do not necessarily need to be joined to the tube body 36. Even in this modification, the distal portion 70a of the insertion aid 70 can be inserted into the space between one of the pocket portions 55 and the tube body 36. This allows the front end portion of the tube body 36 to be inserted to the target position in the gas passage portion 27, so that the same operation and advantages as those in the first and second embodiments are achieved.

The first joint portions 56 do not necessarily need to be orthogonal to the insertion direction, but may be inclined.

If the influence of the pocket portions 55 on the outflow of inflation gas from the gas outflow ports 37, 38 is negligibly small, the pocket portions 55 may be arranged inside the tube body 36. This modification has the same advantages as the first and second embodiments.

<Modifications to First Embodiment>

In FIG. 1, the connection portion 29 may be connected to the gas passage portion 27 at a position that is spaced apart forward or rearward from a substantially center portion of the gas passage portion 27 in the front-rear direction.

The connection portion 29 may be inclined toward the side opposite to the inclination in the first embodiment. That is, the connection portion 29 may be inclined to be lower toward the rear end. In this case, the insertion portion 41 is connected to the tube body 36 while being inclined to be lower toward the rear end. The insertion direction of the inner tube 35 into the airbag body 26 is a rearward direction. An inflator 21 having a gas outlet portion 21a in the rear end portion is arranged to be inclined to be lower toward the rear end. At least the gas outlet portion 21a of the inflator 21 is inserted into the insertion portion 41.

Gas outflow ports that open in a lower portion of the tube body 36 may be provided like the gas outflow ports 39 in the second embodiment. In this case, the gas outflow port 37 may be omitted so that the front end portion of the tube body 36 is closed. Alternatively, the gas outflow port 38 may be omitted so that the rear end portion of the tube body 36 is closed. Further, both of the gas outflow ports 37 and 38 may be omitted so that the front end portion and the rear end portion of the tube body 36 are closed.

<Modifications to Second Embodiment>

The connection portion 29 may be located at a position forward of the gas passage portion 27 instead of a position rearward of the gas passage portion 27. The connection portion 29 extends in the front-rear direction, and the internal space of the connection portion 29 is continuous with the front end portion of a gas passage portion 27. The connection portion 29 includes a connection port 31 in the front end portion, which is the end portion on the side far from the gas passage portion 27.

The insertion portion 41 extends in the front-rear direction, and the internal space of the insertion portion 41 is continuous with the front end portion of the tube body 36. The tube body 36 includes the gas outflow port 37 in the rear end portion. Pocket portions 55 having the same structure as those in the second embodiment are provided in the rear end portion of the tube body 36. The rear end portion of the tube body 36 and the pocket portions 55 are located at positions that are rearward of the rearmost gas outflow port 39.

Even this modification achieves the same operations and advantages as the second embodiment.

In the second embodiment, the tube body 36 may be arranged over the substantially entire length of the gas passage portion 27 or only in part of the gas passage portion 27.

In the second embodiment, in which the connection portion 29 is located rearward of the gas passage portion 27, and in the modification in which the connection portion 29 is located forward of the gas passage portion 27, the gas outflow port 37 may be omitted so that one of the opposite end portions of the tube body 36 in the front-rear direction, that is, the front end portion in the insertion direction, is closed. This configuration has no gas outflow port other than the gas outflow ports 39.

<Other Modifications>

In place of the plate-shaped insertion aid 70, a rod-shaped insertion aid may be used.

The controller 76 may be changed to have a configuration to output an activation signal to the inflator 21 when predicting that an external impact will be applied to the side wall of the vehicle 10.

Vehicles in which the above-described airbag apparatuses can be employed include various industrial vehicles in addition to private cars.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle curtain airbag apparatus, comprising:
an inflator including a gas outlet portion; and
an airbag that is configured to be deployed and inflated toward a space between an occupant and a side wall of a vehicle from a section above the side wall by inflation gas supplied from the gas outlet portion, wherein
the airbag includes an airbag body, an inner tube, and a pocket portion,
the airbag body includes a gas passage portion that extends in a front-rear direction of the vehicle and a connection portion, an internal space of the connection portion being continuous with the gas passage portion, and the inflator being connected to the connection portion,
the inner tube is configured to be arranged inside the airbag body by being inserted into a connection port provided at the connection portion,
the inner tube includes:
  a tube body arranged inside the gas passage portion, the tube body including at least one gas outflow port, and
  an insertion portion that is arranged inside the connection portion with an internal space of the insertion portion being continuous with an internal space of the tube body, at least the gas outlet portion of the inflator being inserted into the insertion portion,
the pocket portion is provided in a front end portion of the tube body in an insertion direction in which the inner tube is inserted into the airbag body,
the pocket portion is configured such that an insertion aid that guides insertion of the inner tube into the airbag body is inserted into the pocket portion,
a front end portion of the pocket portion in the insertion direction is joined to the tube body at a first joint portion that extends in an intersecting direction, the intersecting direction intersecting the insertion direction, and at least one of end portions of the pocket portion in the intersecting direction is joined to the tube body at a second joint portion that extends in the insertion direction.

2. The vehicle curtain airbag apparatus according to claim 1, wherein
the pocket portion is formed integrally with the tube body,
the pocket portion is overlapped with the front end portion of the tube body, and
the pocket portion and the front end portion are joined to each other with front edges of the pocket portion and the front end portion in the insertion direction serving as the first joint portion.

3. The vehicle curtain airbag apparatus according to claim 1, wherein
the connection portion is inclined to be higher toward a rear end in the insertion direction,
the internal space of the connection portion is continuous with the gas passage portion in a front end portion of the connection portion in the insertion direction,
the connection portion includes the connection port in a rear end portion of the connection portion in the insertion direction, and
the front end portion of the tube body in the insertion direction is located forward of the front end portion in the insertion direction of the connection portion.

4. The vehicle curtain airbag apparatus according to claim 1, wherein
the connection portion is located forward or rearward of the gas passage portion in the front-rear direction, and extends in the front-rear direction,
the internal space of the connection portion is continuous with the gas passage portion,
the connection portion includes the connection port in an end portion on a side far from the gas passage portion, and
the at least one gas outflow port includes multiple gas outflow ports that are located rearward of the front end portion of the tube body in the front-rear direction and are separated from each other in the front-rear direction.

5. The vehicle curtain airbag apparatus according to claim 3, wherein
a fist of an AM50 dummy is used as a reference, and a measurement from an outer surface of a forefinger to an outer surface of a little finger in an arrangement direction of fingers of the fist of the AM50 dummy is defined as a measurement M1, and
the front end portion of the tube body is located at a position that is spaced apart from the connection port by a distance longer than twice the measurement M1.

6. The vehicle curtain airbag apparatus according to claim 4, wherein
a fist of an AM50 dummy is used as a reference, and a measurement from an outer surface of a forefinger to an outer surface of a little finger in an arrangement direction of fingers of the fist of the AM50 dummy is defined as a measurement M1, and
the front end portion of the tube body is located at a position that is spaced apart from the connection port by a distance longer than twice the measurement M1.

7. The vehicle curtain airbag apparatus according to claim 1, wherein the pocket portion is arranged outside of the tube body.

* * * * *